United States Patent Office 3,475,454
Patented Oct. 28, 1969

3,475,454
PURIFICATION OF TRIOXANE
Francois Meiller, Palaiseau, France, assignor to Produits Chimiques Pechiney-Saint-Gobain, Paris, France
No Drawing. Filed June 21, 1966, Ser. No. 559,102
Claims priority, application France, July 13, 1965, 24,522
Int. Cl. C07d 19/00
U.S. Cl. 260—340
9 Claims

ABSTRACT OF THE DISCLOSURE

Activated porous alumina is used to extract water, formic acid and formaldehyde from trioxane.

---

This invention relates to the process of purifying trioxane and to trioxane of a higher degree of purity than that which has heretofore been known.

Trioxane has heretofore been used for the preparation of high molecular weight polymers of formaldehyde type, the term polymer including both homopolymers and copolymers. It is known to be necessary to use very pure and essentially anhydrous reactants if high molecular weight polymers of formaldehyde type are to be produced. It is also known that among the usual impurities the removal of which is most difficult are water, formic acid and formaldehyde. It is not too difficult to obtain trioxane containing about 200 parts per million (p.p.m.) of water but it is much more difficult to obtain a sufficient reduction of formic acid and formaldehyde of which 10 p.p.m. of formic acid has heretofore proved to be a limit. If trioxane is to be conserved as a solid in the cold, it is necessary that it contains the least possible amount of formaldehyde. It is necessary, consequently, to use great care in attempting to eliminate these impurities from the trioxane.

It is an object of the invention to make trioxane of higher purity than has heretofore been feasible. Another object is to purify impure trioxane, and to further purify trioxane of known degrees of purity. Another object is to provide an efficient purifier of trioxane. Another object is to purify trioxane by adsorption.

The process of purifying trioxane according to this invention is simple in nature and produces trioxane of great purity, particularly free of formaldehyde, and susceptible of being used directly for the preparation of polymers of high molecular weight of formaldehyde type. The objects of the present invention are accomplished generally speaking by the method of purifying trioxane which comprises bringing it into contact with an adsorbent having activated, porous alumina as an active constituent; and by associated process steps which contribute to the over-all success of the process either as static (batch) or as continuous.

The trioxane to be purified is put into contact with activated alumina of very high porosity and the alumina removes the impurities from the trioxane by selective adsorption. The engagegment of the reactants is effectuated under an atmosphere inert to the reactants. The usual inert gases, for instance nitrogen, are useful. The duration of contact of the reactants is a function of the content of the formic acid and formaldehyde initially contained in the trioxane, and of the temperature at which the purification is carried out. The purification is usually completed in less than 3 hours and in that period of time the trioxane may be completely stripped of formic acid and formaldehyde.

The activated alumina which has been found to be of the highest efficiency in the present purification is obtained by dehydrating hydrated alumina by simple heating at a temperature between about 300° and 600° C. The time required for dehydration may vary from a few seconds to 4 hours. This heating causes a loss of weight in the furnace of about 2 to 6%. These dehydrated aluminas may advantageously have a granulometry, between about 10 and about 200 microns, a surface BET from about 100 to 350 m.$^2$/g., a pore dimeter from about 30 to about 100 A., and a volume of about 25 to about 45 cc. per 100 grams.

During the purification of trioxane by the activated aluminas of this invention the temperature is advantageously maintained at values between about 65° and 90° C., 70° C. approaching the optimum.

According to one way of using the process, the trioxane and the activated alumina are put in contact with each other in a static state.

According to another form of the invention the reaction mass is kept in a state of agitation.

According to a third method, which is usually employed when substantial quantities of impurities are to be removed, the purification is carried out continuously by passing the molten trioxane through a series of columns containing activated alumina while controlling the speed of the trioxane as a function of the quantities of formic acid and formaldehyde which are to be removed.

According to these three modifications of the invention one can use about 1 to about 30 parts by weight of activated alumina to 100 parts of the trioxane which is to be purified.

When a marked inefficiency of adsorption is observed, the porous activated alumina can be reactivated by heating it for a few hours at about 200° C.

The following examples are given for purposes of illustration and do not limit the generality of what is elsewhere herein stated:

Example 1

500 g. of trioxane containing 400 p.p.m. of formaldehyde, 60 p.p.m. of formic acid and 1,300 p.p.m. of water were used. After fusing the trioxane it was put in contact under a nitrogen atmosphere, with alumina of chromatographic type which had been activated and was a powder of which 90% of the grains were between 20 and 100 microns in size, of which the surface BET was 300 mm.$^2$/g., and the quantity used was 50 g., which represented 10% of the weight of the trioxane. After contact of one hour at 70° C. the trioxane was analyzed and found to contain 5 p.p.m. of formaldehyde, 3 p.p.m. of formic acid and 580 p.p.m. of water.

Example 2

The same quantity of molten trioxane described in Example 1 was put in contact under a nitrogen atmosphere with 100 g. (20% of the weight of the trioxane) of activated alumina prepared as described hereinabove. After contact of one hour at 70° C. analysis showed that there was no residual formaldehyde, no formic acid, and only 80 p.p.m. of water.

Example 3

200 g. of trioxane containing 400 p.p.m. of formaldehyde, 140 p.p.m. of formic acid and 2,000 p.p.m. of water were fused and put in contact under a nitrogen atmosphere with 60 g. (30%) of activated alumina of the type described hereinabove. After contact for one hour at 70° C. the trioxane contained no formaldehyde, no formic acid and 80 p.p.m. of water. This was polymerized in the presence of the etherate of boron fluoride as a catalyst, producing a 90% yield in a few minutes of a homopolymer which, after washing was pressed at 180° C. to a thin film having excellent mechanical properties which resisted numerous bending cycles.

Example 4

This is a comparative example designed to show the beneficial effects achieved by the purification as carried out in Example 3. During the polymerization 200 g. of trioxane identical with the 200 g. employed in Example 3 were used without purification. The same catalyst and the same conditions were used as in Example 3. The yield was only 80% in the same period of time, the homopolymer was of low molecular weight, and it could not be compressed at 180° C. into a film.

The advantages of the invention are a method of purifying trioxane which is of greater efficiency than any process heretofore known. Another advantage is the manufacture of a trioxane of higher purity than any heretofore known, especially as to the most undesirable impurities—formaldehyde, formic acid and water, the formaldehyde and formic acid being near or approximating zero, and the water below about 100 p.p.m.

As many apparently widely different embodiments of the present invention may be made without departing from the spirit and scope thereof, it is to be understood that the invention is not limited to the specific embodiments.

What is claimed is:

1. The method of purifying trioxane which comprises bringing trioxane in the molten state into contact at a temperature of about 65–90° C. with a dehydrated, activated alumina of high porosity.

2. A process of purifying trioxane according to claim 1, wherein the alumina has pores varying in size from about 30 to about 100 A.

3. A process of purifying trioxane according to claim 2, wherein the alumina has a granulometry between about 10 and about 200 microns.

4. A process of purifying trioxane according to claim 1, wherein the alumina has pores varying in size from about 30 to about 100 A. and in volume from about 25 to about 45 cc./100 g.

5. A process of purifying trioxane according to claim 4, wherein the alumina has a surface BET between about 100 and about 350 mm.$^2$/g.

6. A process of purifying trioxane according to claim 1, in which the alumina is about 1 to 30% of the weight of the trioxane engaged with it.

7. A process of purifying trioxane according to claim 1, in which the trioxane is brought into contact with the alumina under an inert atmosphere.

8. A process of purifying trioxane according to claim 7, wherein the inert atmosphere consists of nitrogen.

9. A process of purifying trioxane according to claim 1, in which the temperature of the reactants during contact is about 70° C.

References Cited

UNITED STATES PATENTS

| 2,913,464 | 11/1959 | Moseley | 260—333 |
| 3,005,799 | 10/1961 | Wagner | 260—67 |

FOREIGN PATENTS

| 969,185 | 9/1964 | Great Britain. |

NORMA S. MILESTONE, Primary Examiner